United States Patent
Ezrielev et al.

(10) Patent No.: US 12,381,912 B2
(45) Date of Patent: Aug. 5, 2025

(54) VAULT OVERWRITING AFTER PLC (PROTECTION LIFECYCLE) DESIGNATION DISALLOWANCE BY TRANSMISSION TO PUBLIC VAULT

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 18/295,338

(22) Filed: Apr. 4, 2023

(65) Prior Publication Data
US 2024/0340309 A1    Oct. 10, 2024

(51) Int. Cl.
*H04L 9/40* (2022.01)
*G06F 11/14* (2006.01)

(52) U.S. Cl.
CPC ...... *H04L 63/1466* (2013.01); *G06F 11/1458* (2013.01); *H04L 63/1433* (2013.01); *G06F 2201/84* (2013.01)

(58) Field of Classification Search
CPC ............. H04L 63/1466; H04L 63/1433; G06F 11/1458; G06F 2201/84
See application file for complete search history.

(56) References Cited

U.S. PATENT DOCUMENTS

| | | | |
|---|---|---|---|
| 2017/0140156 A1* | 5/2017 | Gu | G06F 11/1458 |
| 2018/0330088 A1* | 11/2018 | Crofton | G06F 21/566 |
| 2020/0201827 A1* | 6/2020 | Chacko | G06F 16/188 |
| 2021/0382995 A1* | 12/2021 | Massiglia | G06F 3/0659 |
| 2022/0244858 A1* | 8/2022 | Grunwald | G06F 11/2094 |
| 2022/0292196 A1* | 9/2022 | Bhagi | G06F 21/554 |
| 2023/0089313 A1* | 3/2023 | Shua | G06F 11/1464 726/23 |
| 2023/0247032 A1* | 8/2023 | Chacko | H04L 63/166 726/22 |
| 2023/0262090 A1* | 8/2023 | Rodriguez | G06F 21/568 726/23 |
| 2024/0184886 A1* | 6/2024 | Kutner | G06F 3/0673 |
| 2024/0320146 A1* | 9/2024 | Karr | G06F 3/0641 |

\* cited by examiner

*Primary Examiner* — Stephen T Gundry
(74) *Attorney, Agent, or Firm* — Workman Nydegger

(57) ABSTRACT

One method includes monitoring a ransomware risk measure, when the ransomware risk measure indicates the presence of a suspected ransomware process, determining if it is time to overwrite a snapshot stored in backup data storage, and when it is time to overwrite the snapshot, moving the snapshot from the backup data storage to a vault to free space in the backup data storage for new snapshots that continue to be taken after the presence of suspected ransomware is indicated.

20 Claims, 3 Drawing Sheets

VAULT OVERWRITING AFTER PLC (PROTECTION LIFECYCLE) DESIGNATION DISALLOWANCE BY TRANSMISSION TO PUBLIC VAULT

FIELD OF THE INVENTION

Embodiments of the present invention generally relate to detection of possible malware, such as ransomware. More particularly, at least some embodiments of the invention relate to systems, hardware, software, computer-readable media, and methods, for managing backed up data when the possibility of the presence of ransomware is indicated.

BACKGROUND

Some types of ransomware may begin their operation by corrupting/encrypting backups, followed by the encryption of production data. Where a vault is employed for data storage, for example, the ransomware may be able to corrupt or encrypt the data sent to the vault. Consequently, new snapshots stored in the vault after detection of the ransomware must be assumed to be corrupted. Because the new snapshots are assumed to be corrupted, older snapshots known to be uncorrupted, and which otherwise may be circulated out of the vault after a period of time, may instead be retained. While retention of the old, uncorrupted, snapshots may help with data protection and restoration, the snapshot storage space will eventually fill, and further snapshots cannot be stored.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
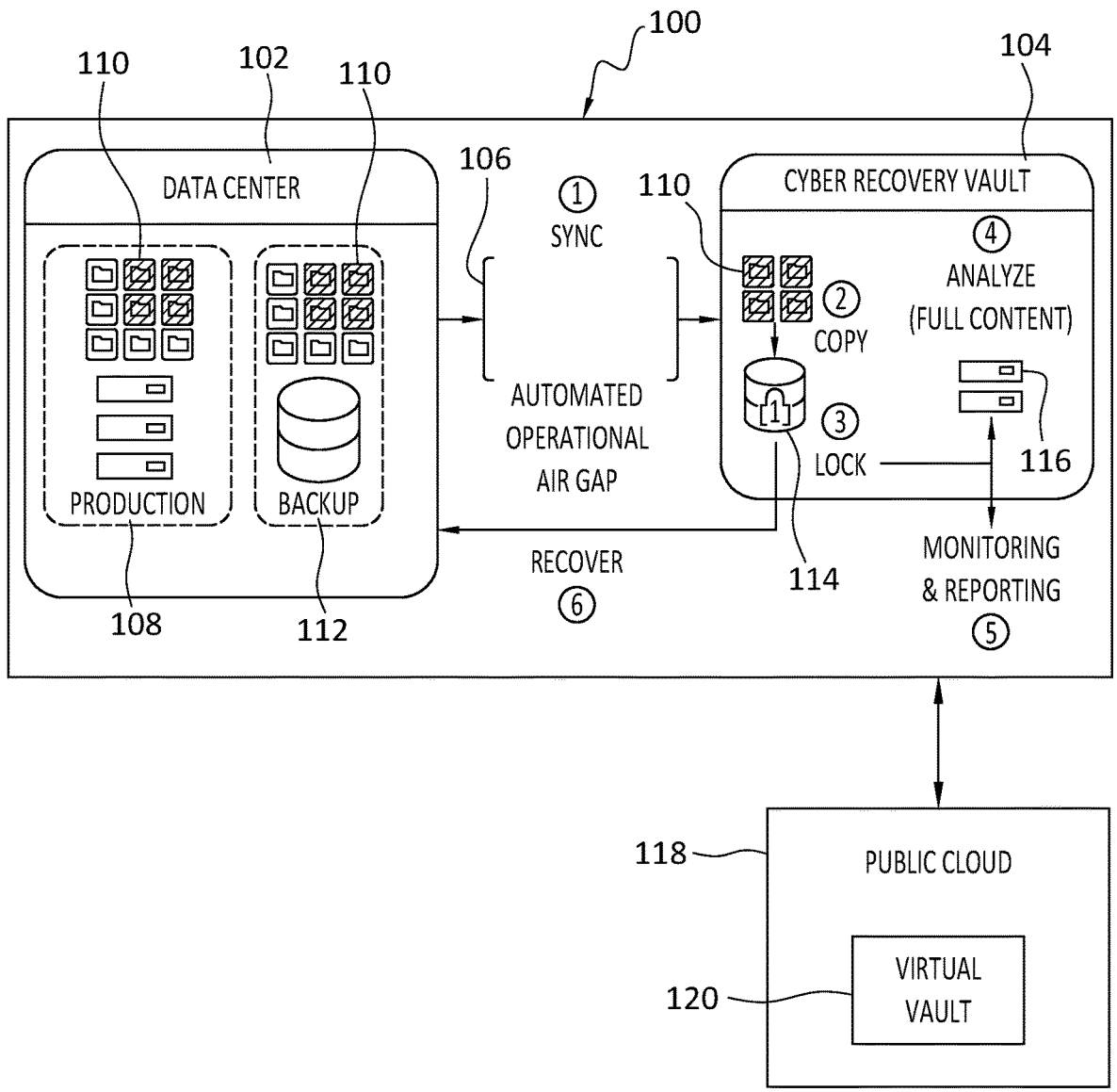
FIG. 1 discloses aspects of an example operating environment and architecture according to one embodiment.

Embodiments of the present invention generally relate to detection of possible malware, such as ransomware. More particularly, at least some embodiments of the invention relate to systems, hardware, software, computer-readable media, and methods, for managing backed up data when the possibility of the presence of ransomware is indicated.

In an embodiment, when the presence of possible ransomware is suspected, any subsequent snapshots or other backups of data may correspondingly be suspected to be corrupted or encrypted by the ransomware. Consequently, older snapshots taken prior to the detection may be retained in storage, rather than being overwritten as normally scheduled. Retention of these snapshots for a longer time period than normal, while also storing new snapshots taken after the detection and which may or may not be corrupted, may cause the snapshot storage to fill. Because there may be uncertainty as to whether or not ransomware is present, snapshots may continue to be taken after the detection.

Thus, in an embodiment, when it is determined, for example, that a risk measure exceeds a defined threshold, a virtual vault may be spun up, such as at a public cloud storage site for example. Some of the stored snapshots may then be migrated to the virtual vault, prior to being overwritten in the snapshot storage, so as to free space for additional snapshots. If it is later determined that there actually was no ransomware operating, the virtual vault and its contents may be deleted. On the other hand, if ransomware was detected, data determined to be uncorrupted can be recovered from the virtual vault and/or from the snapshot storage. After the ransomware has been dealt with, and the uncorrupted data recovered, the virtual vault and its contents may be deleted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an embodiment may accommodate, and respond to, non-binary risk estimations with respect to the presence of ransomware in a system, that is, risk estimations other than either 'yes' ransomware is present, or 'no' ransomware is not present. An embodiment may provide an approach for dealing with snapshots and storage space even where it is not known, at least initially, whether or not ransomware is present in the system. An embodiment may enable operations to continue, and data to be protected, notwithstanding the possible presence of ransomware in the system. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, details are provided concerning aspects of an example operating environment 100 in which example embodiments may be employed. In the illustrative, and non-limiting, example of FIG. 1, a data center 102 is configured for communication with a vault 104 to which data from the data center 102 can be backed up. The vault 104, which may take the form of a Dell CyberRecovery vault for example, may be isolated from the data center 102, except under specified conditions, by a physical air gap 106. In general, the nature of the air gap 106 is such that when the air gap 106 is in place, that is, the air gap 106 is open, there is no physical or other connection between the vault 104 and the data center 102, thus ensuring the security and integrity of any data stored in the vault 104. Security procedures may be implemented that provide for selective closing of the air gap 106, for a limited time, so that the data center 102 and the vault 104 can communicate with each other. In at least some instances, the vault 104 may control the opening and closing of the air gap 106.

The data center 102 may include a production system 108 in which data 110 is generated. Some or all of the data 110 may be backed up to, or at least accessible by way of, a namespace in a backup environment 112 of the data center 102. In an embodiment, the backups of the data 110 may comprise one or more snapshots, which may be taken on a regular basis and/or some other temporal basis, and stored in the vault 104. That is, some or all of the data 110 in the namespace of the backup environment 112 may be replicated to the vault 104. In an embodiment, the vault 104 may include, or provide, a namespace 114 configured to receive a PIT (point in time) copy of the namespace that was replicated from the backup environment 112. Finally, the vault 104 may comprise a further namespace 116, which may be referred to herein simply as a 'sandbox' or 'sandbox namespace.'

Various operations may be performed in the operating environment 100, as described hereafter. The data 110 journey may begin when it is created or modified in the production system 108 and then backed up to a namespace in the backup environment 112. A subset of the data 110, such as a group of files, in the backup environment 112 may then be replicated over (1) to the vault 104. In general, the vault 104 may serve as another backup environment, and may be air gapped, as described earlier herein. After the data 110 has landed in the vault 104 namespace, a Point In Time (PIT) copy of that namespace may be copied over (2) to another namespace in the vault 104, and the copy then retention locked (3). At this stage, the infrastructure, that is the vault 104, guarantees immutability of the data stream. Next, this locked copy of the data 110 may be copied into another namespace, or sandbox. The data in the sandbox may be subjected (4) to an analyze routine, and that data and/or sandbox may also be subjected to monitoring and reporting (5), for example to determine, and report on, an outcome of the analysis (4). The analyze routine may comprise a ML algorithm which scans the data 110 in the sandbox for malware, such as ransomware for example. If any malware is detected, that is reported. If the scan does not reveal any problems, then the sandbox, that is, the namespace to which the locked data was copied, is marked as 'deleted' once the process is complete. At some point thereafter, the data in the vault 104 may be recovered (6) to the data center 110.

With continued reference to the example of FIG. 1, the operating environment 100 may comprise a public cloud data storage site 118. From time to time, and as discussed in more detail elsewhere herein, one or more virtual vaults 120 may be spun up in the public cloud data storage site 118. The virtual vaults 120 may be ephemeral and may be deleted after a period of time, and/or in particular circumstances. In general, the virtual vault 120 may receive data backups, such as snapshots for example, from a vault, such as the vault 104, and/or from other data storage sites. Data stored in the virtual vault 120 may be restored, such as to the data center 102, vault 104, and/or to one or more other sites.

B. Detailed Discussion of An Example Embodiment

Various risk measures may be used to monitor operations in a computing environment, such as a data protection environment for example, to check for the possibility of ransomware. Some of these risk measures are binary, in the sense that they may indicate 'yes' there is ransomware running in the environment, or 'no' there is no ransomware running in the environment. Such binary approaches can be problematic however, since they may fail to take account of trending behaviors that may not initially, but do eventually, indicate the presence of ransomware. Thus, risk measures have been developed with this latter circumstance in mind.

Suppose, for example, that a risk measure value generated by a malware detection mechanism has increased above a predetermined threshold. It may be the case that that the risk measure value is such that it would not necessarily justify shutting down a production site, but because the risk measure is over the threshold, it should still be accommodated in some way, and not simply ignored.

Some ransomware operates by first corrupting/encrypting backups. Afterwards, the ransomware may then encrypt the production data. In some cases, the ransomware may even corrupt the data, such as snapshots and other backups, sent to the vault. As a result, an embodiment may assume that new snapshots, that is, snapshots taken after the presence of ransomware is at least suspected, such as when the threshold has been exceeded, are untrustworthy. As a result, older snapshots known, and/or likely, to be uncorrupted may be retained in storage, rather than being circulated out of storage and deleted, as may otherwise occur according to a typical schedule.

While the retention of these older snapshots may provide some level of assurance that there is some data unaffected by the possible ransomware, the data storage will eventually fill, since snapshots may continue to be taken, and stored, even after the risk measure value passes the threshold. The continued taking of snapshots after the threshold is exceeded represents a hedge in that, if it is determined that there is actually no ransomware present, data protection operations have thus continued to be performed without interruption. On the other hand however, there is the possibility that ransomware is, in fact, present.

In order to accommodate all of these possible circumstances, an embodiment may, when a risk measure exceeds a specified threshold, spin up a virtual vault, such as a DellEMC DataDomain virtual vault (DDV), in a public cloud storage site. The older snapshots may then be moved or replicated from the vault or other backup storage to the virtual vault, and then deleted from the vault or other backup storage. Then, if a determination is made that there is no ransomware present, the virtual vault can be discarded. There may be no need to restore any data from the virtual vault since, as noted above, an embodiment may provide for ongoing snapshot operations which will have created, and stored, new snapshots. Because it was determined there was no ransomware present, it may be determined that these new snapshots are uncorrupted and can be safely stored, and restored, as/if needed. Correspondingly, the older snapshots may be safely deleted since newer, uncorrupted, data, that is, the new snapshots, are available.

In the event that it is determined that ransomware was, in fact, present, an embodiment may recover snapshots from the virtual vault, or the vault, that is, from wherever there is uncorrupted data. Thus, an embodiment may provide that, when a risk estimation of a malware detection engine goes above a threshold, instead of overwriting, that is, circulating out, old snapshots, the old snapshots are instead moved or replicated to a virtual vault. In this way, an embodiment may accommodate non-binary risk estimations and impose less disruption on production operations than would be imposed absent the use of a virtual vault, in which case, production could be partly, or completely, shut down if there were no virtual vault.

C. Example Methods

Figure 2:
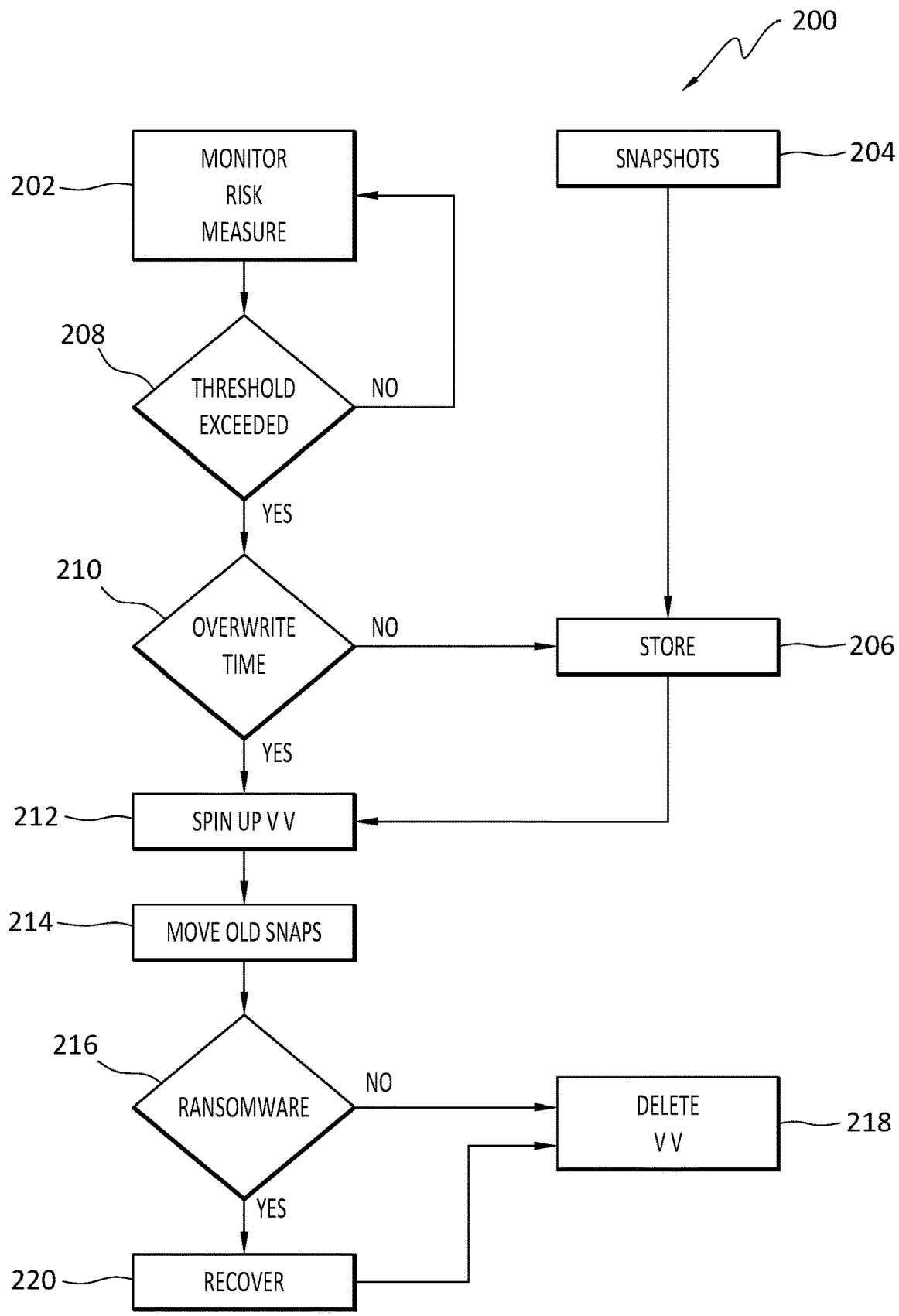
FIG. 2 discloses aspects of an example method according to one embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to one embodiment is denoted generally at 200. As shown, the monitoring 202 of risk measures, and creation of snapshots or other backups 204, may be taking place at the same time. In fact, the creation of snapshots 204, and storage 206 of the snapshots, may be ongoing while the various other operations of the method 200 are performed.

One or more checks 208 may be performed at various times to determine if the monitoring 202 indicates the possible presence of ransomware. In an embodiment, the check 208 may determine if a risk measure, or measures, has/have exceeded a defined threshold, but this is only one example of a check that may be performed as to the possible presence of ransomware, and is not intended to limit the scope of the invention in any way. Thus, this threshold approach is used only for the purposes of illustration in the example of FIG. 2.

If the check 208 indicates that the risk measure has not exceeded the threshold, the method 200 may return to 202. On the other hand, if the check 208 indicates that the risk measure has exceeded the threshold, thus indicating the presence of suspected ransomware, the method 200 may proceed to 210 where a check is performed to determine, for example, if it is time to overwrite any of the older snapshots in storage, that is, if the time come when one or more snapshots in storage would ordinarily be overwritten. If not, snapshots may continue to be stored 206 in storage.

On the other hand, if it is determined at 210 that it is time to overwrite one or more snapshots in the storage, as a result of the storage having reached capacity, the method 200 may proceed to 212 where a virtual vault or other virtual storage is spun up at a storage site, such as a public cloud storage site for example. The storage capacity of the virtual vault may be a function of, for example, the size of the snapshots being generated 204, and the rate at which those snapshots are being generated 204. After the virtual vault(s) has/have been spun up 212, the older snapshots that were stored 206 may, instead of being overwritten as might ordinarily occur, instead be moved/replicated 214 to the new virtual vaults, thus freeing storage space for the snapshots that may continue to be produced 204.

At some point, or on a continual basis, a determination may be made 216 as to whether or not ransomware is actually present. For example, ransomware may be determined to be present if a risk measure is above a second threshold, or not be present if the risk measure is below the first threshold, such as the threshold referred to at 208. If no ransomware is determined 216 to be present, the virtual vault(s) may simply be deleted 218. If a determination 216 is made that ransomware was/is, in fact, present, data may be restored 220 from the virtual vault and/or snapshot storage, that is, from wherever uncorrupted data is determined to exist.

D. Further Example Embodiments

Following are some further example embodiments of the invention. These are presented only by way of example and are not intended to limit the scope of the invention in any way.

Embodiment 1. A method, comprising: monitoring a ransomware risk measure;
when the ransomware risk measure indicates a presence of a suspected ransomware process, determining if it is time to overwrite a snapshot stored in backup data storage; and
when it is time to overwrite the snapshot, moving the snapshot from the backup data storage to a vault to free space in the backup data storage for new snapshots that continue to be taken after the presence of suspected ransomware is indicated.

Embodiment 2. The method as recited in any preceding embodiment, wherein the vault comprises a virtual vault located at a public cloud data storage site.

Embodiment 3. The method as recited in any preceding embodiment, wherein the ransomware risk measure indicates the presence of the suspected ransomware process when the ransomware risk measure exceeds a defined threshold.

Embodiment 4. The method as recited in any preceding embodiment, wherein the snapshots comprise data generated by a production system.

Embodiment 5. The method as recited in any preceding embodiment, wherein after the snapshot is transmitted to the vault, the vault hosts the snapshot until the risk measure falls below a defined threshold and/or until a determination is made that there is no risk of the new snapshots being compromised by the suspected ransomware process.

Embodiment 6. The method as recited in any preceding embodiment, wherein one of the snapshots moved from the backup data storage to the vault was taken before the presence of the suspected ransomware process was indicated.

Embodiment 7. The method as recited in any preceding embodiment, wherein after the suspected ransomware process is determined not to be a ransomware process, the vault and any data in the vault are deleted.

Embodiment 8. The method as recited in any preceding embodiment, wherein after the suspected ransomware process is determined to be a ransomware process, uncorrupted data is restored from the backup data storage and/or from the vault.

Embodiment 9. The method as recited in any preceding embodiment, wherein after the ransomware risk measure indicates a presence of the suspected ransomware process, a snapshot in the backup data storage is retained in the backup data storage until being transferred to the vault, rather than being overwritten.

Embodiment 10. The method as recited in any preceding embodiment, wherein the suspected ransomware process is determined to be a ransomware process, and the ransomware process is of a type that first encrypts the snapshots, and then encrypts production data from which the snapshots were created.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
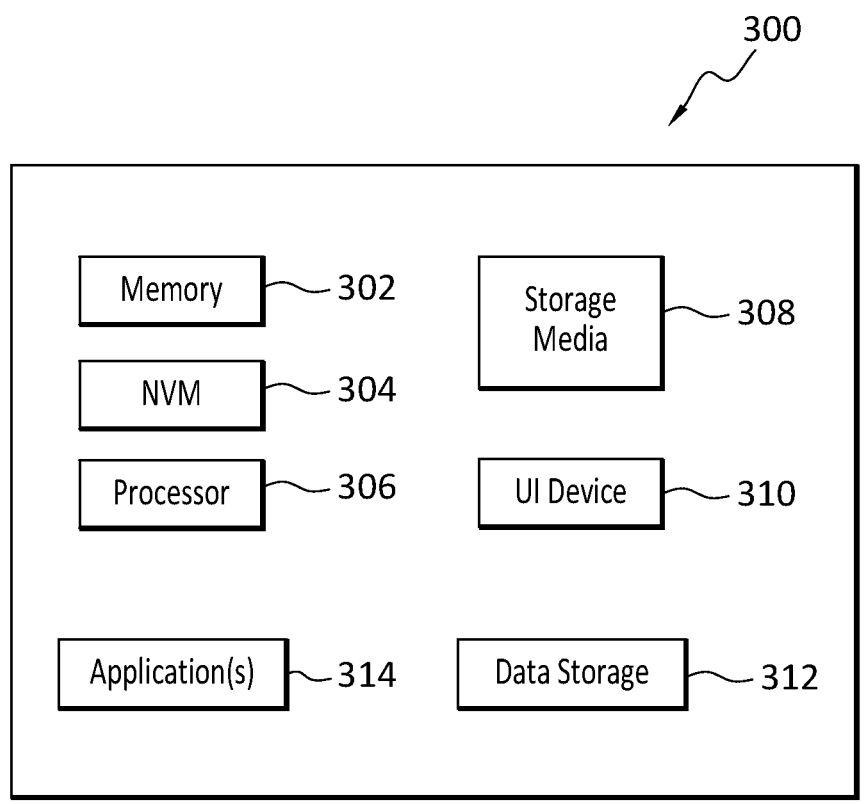
FIG. 3 discloses an example computing entity configured and operable to perform any of the disclosed methods, processes, and inventions.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

monitoring a ransomware risk measure;

when the ransomware risk measure indicates a presence of a suspected ransomware process, determining if it is time to overwrite a snapshot stored in backup data storage; and when it is time to overwrite the snapshot, moving the snapshot from the backup data storage to a vault to free space in the backup data storage for new snapshots that continue to be taken after the presence of suspected ransomware is indicated.

2. The method as recited in claim 1, wherein the vault comprises a virtual vault located at a public cloud data storage site.

3. The method as recited in claim 1, wherein the ransomware risk measure indicates the presence of the suspected ransomware process when the ransomware risk measure exceeds a defined threshold.

4. The method as recited in claim 1, wherein the vault is spun up after the ransomware risk measure has exceeded a defined threshold.

5. The method as recited in claim 1, wherein after the snapshot is transmitted to the vault, the vault hosts the snapshot until the risk measure falls below a defined threshold and/or until a determination is made that there is no risk of the new snapshots being compromised by the suspected ransomware process.

6. The method as recited in claim 1, wherein one of the snapshots moved from the backup data storage to the vault was taken before the presence of the suspected ransomware process was indicated.

7. The method as recited in claim 1, wherein after the suspected ransomware process is determined not to be a ransomware process, the vault and any data in the vault are deleted.

8. The method as recited in claim 1, wherein after the suspected ransomware process is determined to be a ransomware process, uncorrupted data is restored from the backup data storage and/or from the vault.

9. The method as recited in claim 1, wherein after the ransomware risk measure indicates a presence of the suspected ransomware process, a snapshot in the backup data storage is retained in the backup data storage until being transferred to the vault, rather than being overwritten.

10. The method as recited in claim 1, wherein the suspected ransomware process is determined to be a ransomware process, and the ransomware process is of a type that first encrypts the snapshots, and then encrypts production data from which the snapshots were created.

11. A non-transitory storage medium having stored therein instructions that are executable by one or more hardware processors to perform operations comprising:

monitoring a ransomware risk measure;

when the ransomware risk measure indicates a presence of a suspected ransomware process, determining if it is time to overwrite a snapshot stored in backup data storage; and when it is time to overwrite the snapshot, moving the snapshot from the backup data storage to a vault to free space in the backup data storage for new snapshots that continue to be taken after the presence of suspected ransomware is indicated.

12. The non-transitory storage medium as recited in claim 11, wherein the vault comprises a virtual vault located at a public cloud data storage site.

13. The non-transitory storage medium as recited in claim 11, wherein the ransomware risk measure indicates the presence of the suspected ransomware process when the ransomware risk measure exceeds a defined threshold.

14. The non-transitory storage medium as recited in claim 11, wherein the vault is spun up after the ransomware risk measure has exceeded a defined threshold.

15. The non-transitory storage medium as recited in claim 11, wherein after the snapshot is transmitted to the vault, the vault hosts the snapshot until the risk measure falls below a defined threshold and/or until a determination is made that there is no risk of the new snapshots being compromised by the suspected ransomware process.

16. The non-transitory storage medium as recited in claim 11, wherein one of the snapshots moved from the backup data storage to the vault was taken before the presence of the suspected ransomware process was indicated.

17. The non-transitory storage medium as recited in claim 11, wherein after the suspected ransomware process is determined not to be a ransomware process, the vault and any data in the vault are deleted.

18. The non-transitory storage medium as recited in claim 11, wherein after the suspected ransomware process is determined to be a ransomware process, uncorrupted data is restored from the backup data storage and/or from the vault.

19. The non-transitory storage medium as recited in claim 11, wherein after the ransomware risk measure indicates a presence of the suspected ransomware process, a snapshot in the backup data storage is retained in the backup data storage until being transferred to the vault, rather than being overwritten.

20. The non-transitory storage medium as recited in claim 11, wherein the suspected ransomware process is determined to be a ransomware process, and the ransomware process is of a type that first encrypts the snapshots, and then encrypts production data from which the snapshots were created.

* * * * *